United States Patent [19]

Michel

[11] 3,909,393

[45] Sept. 30, 1975

[54] TRIMETALLIC REFORMING CATALYST AND USE THEREOF

[75] Inventor: Max Michel, Montmorency, France

[73] Assignee: Societe Francaise des Produits pour Catalyse, Rueil-Malmaison, France

[22] Filed: Aug. 6, 1973

[21] Appl. No.: 385,647

[30] Foreign Application Priority Data

Aug. 16, 1972   France .............................. 72.29387

[52] U.S. Cl. ................ 208/139; 208/138; 252/441; 252/466 PT
[51] Int. Cl..... C10g 35/08; B01j 11/78; B01j 11/12
[58] Field of Search....... 208/139, 138; 252/466 PT, 252/441

[56] References Cited
UNITED STATES PATENTS

| | | | |
|---|---|---|---|
| 2,378,209 | 6/1945 | Fuller et al. .......................... | 208/138 |
| 2,500,146 | 3/1950 | Fleck et al. .......................... | 208/138 |
| 2,848,377 | 8/1958 | Webb.................................. | 208/138 |
| 3,523,964 | 8/1970 | Kober et al. ......................... | 252/441 |
| 3,632,620 | 1/1972 | Kober et al. ......................... | 252/441 |
| 3,657,265 | 4/1972 | Kober et al. ......................... | 252/441 |
| 3,770,616 | 11/1973 | Kominami et al. .................. | 208/138 |
| 3,799,867 | 3/1974 | Cardwell et al..................... | 208/139 |

FOREIGN PATENTS OR APPLICATIONS 288,893   1/1971   U.S.S.R........................ 252/466 PT

*Primary Examiner*—Delbert E. Gantz
*Assistant Examiner*—James W. Hellwege
*Attorney, Agent, or Firm*—Millen, Raptes & White

[57] ABSTRACT

A new catalyst is disclosed, which contains platinum, iridium and niobium on an alumina carrier. This catalyst may be used for hydrocarbon conversion, for example reforming, at 450°–600°C. High octane ratings and hydrogen yields are obtained.

7 Claims, No Drawings

TRIMETALLIC REFORMING CATALYST AND USE THEREOF

The invention concerns a new catalyst essentially containing (a) alumina, (b) platinum, (c) iridium and (d) niobium.

The invention also concerns the use of this catalyst in reaction of hydrocarbon conversion, particularly in reforming.

Catalysts containing platinum carried on alumina have been known for a long time. Although these catalysts have been improved on many points, for example by incorporating additives such as tungsten, molybdenum, germanium, iridium and rhodium, the search of new platinum-containing catalysts is continued, with the hope that such new catalysts will give higher yields and have a longer life, as compared with the known catalysts. An effort is also made to improve the mechanical properties of these catalysts since these catalysts are conventionally used in fixed or moving bed, in the form of agglomerates, for example balls or extrudates, of appreciable size, so as to leave an easy passage to the gaseous reactants. During wear of these catalysts, fine grained particles are obtained which result in a reduction of the free space, thereby requiring an increase in the reactants inlet pressure, if not a cessation of the operation.

It has now been found that, when using a catalyst based on alumina and containing both platinum, iridium and niobium, particularly high yields may be obtained, for example in reforming reactions. These yields may be maintained over long periods, and improved mechanical properties are also observed. Iridium, when associated with platinum, results in a longer catalyst life but also in a lower selectivity, mainly when the catalyst is new. It has been found that niobium obviates this selectivity defect.

The porous alumina used for manufacturing reforming catalyst are well-known and will not be described further.

The catalyst of the invention preferably contains 0.005–1% and particularly 0.05–0.8% of platinum, 0.005–1% and particularly 0.01–0.09% of iridium and 0.005–5% and particularly 0.05–3% of niobium, these values being by weight with respect to the catalyst carrier.

According to a preferred embodiment, the catalyst also contains 0.1–10% and particularly 0.2–5% by weight, with respect to the catalyst carrier, of halogen, for example chlorine or fluorine.

The catalyst may be manufactured according to conventional methods. A method consists, for example, in impregnating the carrier by means of solutions of the desired metal compounds. Either a common solution of these metals is used, or distinct solutions for each metal or group of metals. Aqueous solutions are preferred, as well as solutions in hydrochloric acid or in an alcohol.

When distinct solutions are used, intermediate drying and/or calcining may take place.

The manufacturing process is usually terminated by calcining at 400°–1000°C, preferably in the presence of free oxygen, for example by blowing in air.

The following niobium compounds are given by way of examples: niobium pentachloride, pentafluoride, hydrogen oxalate or oxychloride, and the many complexes formed with organic polycarboxylic acids, for example with tartaric acid, citric acid and malic acid.

Platinum may be used in any known form, for example as chloroplatinic acid, ammonium chloroplatinate, platinum sulfide, sulfate or chloride. Iridium may be used in any known form, for example as chloride, bromide, sulfate or sulfide.

Halogen may be supplied as one of the above halides or in the form of HCl, HF, ammonium chloride, ammonium fluoride, gaseous chlorine or hydrocarbon halide, for example $CCl_4$, $CHCl_3$ or $CH_3Cl$.

The obtained catalysts may be used in the many known reactions of hydrocarbon conversion for which the use of platinum catalysts has previously been proposed, particularly reforming, dehydrogenation, aromatization, dehydrocyclisation, isomerization and hydrocracking. These reactions are conventionally carried out in the general temperature range of from 300° to 600°C.

As for reforming, it is usually carried out at a temperature of from about 450° to 600°C, under a pressure of about 5–20 kg/cm² and at an hourly space velocity of 0.5–10 volumes of liquid charge (naphtha boiling between about 60° and 220°C) per volume of catalyst.

The following examples are given to illustrate the invention without limiting the scope thereof.

EXAMPLE 1

A catalyst "C" is manufactured as follows:

100 grams of extrudates of activated alumina are impregnated with 70 ml of solution "A": the whole solution fills without excess the pores of the so-defined alumina carrier:

- specific surface: 200 m² per gram
- total pore volume: 0.7 ml per gram
- diameter of the extrudates: 1.3 mm
- $Na_2O$ content by weight: 55 parts per million
- Fe content by weight 105 parts per million
- loss at 1,000°C: 2.1%

Solution A is prepared by dissolving 0.15 g of niobium, in the form of niobium pentachloride, into concentrated hydrochloric acid and then adding distilled water up to 70 ml.

The 70 ml of solution A contain 0.15 g of niobium and 4 g of HCl.

After drying in a steam-oven at 100°C, the carrier containing niobium is calcined at 450°C for 2 hours and impregnated once more without excess with 70 ml of a solution B containing 0.35 g of platinum and 0.05 g of iridium in the respective forms of chloroplatinic acid and chloroiridic acid.

After drying in a steam-oven at 100°C, the catalyst is calcined at 500°C in a stream of dry air and then reduced in hydrogen at 500°C. The resulting catalyst "C" contains 0.35% of platinum, 0.05% of iridium, 0.15% of niobium and 1.2% of chlorine. The specific surface of the obtained catalyst is 195 m² per gram and its pore volume 0.68 ml/g.

The following naphtha is treated:
Distillation ASTM: 90°–190°C
Composition by weight:
- aromatic hydrocarbons: 9%
- naphthenic hydrocarbons: 29%
- paraffinic hydrocarbons: 62%

Density at 20°C: 0.749

The water content of the feed charge is lower than 50 ppm.

This naphtha is passed with hydrogen over the catalyst C, such as hereinbefore manufactured, and, by way of comparison, over a catalyst C' containing 0.35% by weight of platinum, 0.05% by weight of iridium and 1.2% by weight of chlorine. The molar ratio $H_2$/hydrocarbons is 8. The other operation conditions are given in the following table I. Table I also gives the clear octane number and the hydrogen percent of the recycled gas when the desired octane number has been obtained.

TABLE I

| Catalyst | Inlet temperature °C | Pressure bars | Naphtha w./Catalyst w./hour | Clear octane No. | % $H_2$ in the recycled gas |
|---|---|---|---|---|---|
| C | 485 | 25 | 2.5 | 93 | 87.4 |
| C' | 485 | 25 | 2.5 | 91.2 | 85.4 |
| C | 505 | 10 | 1.67 | 101.4 | 86.6 |
| C' | 505 | 10 | 1.67 | 100.1 | 82.5 |
| C | 530 | 10 | 1.67 | 104 | 76.3 |
| C' | 530 | 10 | 1.67 | 102.5 | 74.8 |

It may be observed that catalyst C containing niobium gives a higher O.N. and a higher recycled hydrogen content than catalyst C' not containing niobium.

EXAMPLE 2

A catalyst $C_1$ is prepared, which contains alumina and 0.35% of platinum, 0.05% of iridium, 0.67% of niobium and 1.2% of chlorine, these values being by weight with respect to alumina. Catalyst $C_1$ is manufactured in the same way as catalyst C, except that the solution A has been prepared from 0.67 g of niobium, instead of 0.15 g in example 1, in the form of niobium pentachloride.

A catalyst $C_2$ is also prepared; it contains alumina and 0.35% of platinum, 0.05% of iridium, 2% of niobium and 1.2% of chlorine, these values being by weight with respect to alumina. Catalyst $C_2$ is prepared as catalyst C, except that the solution A is prepared by dissolving 2 g of niobium, in the form of niobium pentoxide hydrate, into 70 ml of an aqueous solution of oxalic acid at such a concentration that the ratio $Nb_2O_5/C_2O_4H_2$ be 1/6.

A catalyst $C_3$ is prepared according to a method identical to that used with catalyst C; it contains alumina and 0.25% of platinum, 0.15% of iridium, 0.15% of niobium and 1.2% of chlorine by weight with respect to alumina.

A catalyst $C_4$ is prepared according to the same method as catalyst $C_2$; it contains 0.25% of platinum, 0.15% of iridium, 2% of niobium and 1.2% of chlorine.

A catalyst $C'_3$ is prepared according to the method described with respect to catalyst C, except that solution A is not used; this catalyst contains alumina, 0.40% of platinum, 0.15% of iridium and 1.2% of chlorine by weight with respect to alumina. A catalyst $C'_4$ is prepared according to the same method; it contains alumina, 0.25% of platinum, 0.30% of iridium and 1.2% of chlorine.

Finally, two catalysts C'' and C''' are prepared. Catalyst C'' contains alumina, 2% of niobium and 1.2% of chlorine; catalyst C''' contains alumina, 2.40% of niobium and 1.2% of chlorine.

Catalysts $C'_3$, $C'_4$, C'' and C''' are no part of the invention and have been used for comparative purpose only.

The naphtha of example 1 is treated with hydrogen at an inlet temperature of 530°C in the presence of the catalysts $C_1$, $C_2$, $C_3$, $C_4$, $C'_3$, $C'_4$, C'' and C'''. The other experimental conditions are those of example 1, i.e.:
 pressure: 10 bars
 molar ratio $H_2$/hydrocarbons: 8
 naphtha weight/catalyst weight/hour: 1.67
The results are given in table II.

Comparative results which are obtained at 530°C with catalysts C and C' in example 1, are also given.

TABLE II

| Catalyst | Composition of the catalyst % b.w. | | | Octane number CLEAR | % $H_2$ in recycle gas |
|---|---|---|---|---|---|
| | Pt | Ir | Nb | | |
| C | 0.35 | 0.05 | 0.15 | 104 | 76.3 |
| $C_1$ | 0.35 | 0.05 | 0.67 | 105 | 78 |
| $C_2$ | 0.35 | 0.05 | 2 | 103 | 80 |
| $C_3$ | 0.25 | 0.15 | 0.15 | 106 | 72 |
| $C_4$ | 0.25 | 0.15 | 2 | 104 | 74 |
| C' | 0.35 | 0.05 | 0 | 102.5 | 74.8 |
| $C'_3$ | 0.40 | 0.15 | 0 | 99.5 | 66 |
| $C'_4$ | 0.25 | 0.30 | 0 | 99.8 | 66.9 |
| C'' | 0 | 0 | 2 | 90 | 66 |
| C''' | 0 | 0 | 2.4 | 90.5 | 67 |

The advantage of adding niobium appears from table II, particularly when comparing the results obtained with catalysts C', C, $C_1$ and $C_2$. The improvement of the results might be attributed to the mere addition of niobium; however, when comparing the results obtained with catalysts C, $C'_3$ and $C'_4$ having the same total content of metallic elements, it appears that catalyst C containing platinum, iridium and niobium gives far better results than catalysts $C'_3$ and $C'_4$ not containing niobium.

By comparing the results obtained with catalysts $C_2$, $C_4$ and C''', it appears that catalyst C''' containing only niobium gives poor results.

What I claim is:

1. A catalyst, which comprises an alumina carrier 0.005–1% of platinum, 0.005–1% of iridium and 0.005–5% of niobium by weight with respect to the alumina carrier.

2. A catalyst according to claim 1, which comprises 0.05–3% by weight of niobium with respect to the alumina carrier.

3. A catalyst according to claim 1, which comprises 0.05–0.8% of platinum, 0.01–0.09% of iridium and 0.05–3% of niobium by weight with respect to the alumina carrier.

4. A catalyst according to claim 1, further comprising 0.1–10% by weight of halogen with respect to the catalyst carrier.

5. A catalyst according to claim 1 further comprising 0.2–5% by weight of chlorine with respect to the catalyst carrier.

6. A process of catalytically reforming hydrocarbons at 450°–600°C, wherein the improvement comprises employing a catalyst according to claim 1.

7. A process of catalytically reforming hydrocarbons at 450°–600°C, wherein the improvement comprises employing a catalyst according to claim 3.

* * * * *